(12) United States Patent
Campo Giralte et al.

(10) Patent No.: US 9,942,135 B2
(45) Date of Patent: *Apr. 10, 2018

(54) NETWORK TRAFFIC CLASSIFICATION

(71) Applicant: International Business Machines Corporation, Armonk, NY (US)

(72) Inventors: Luis Campo Giralte, Dublin (IE); Jose Luis Mujeriego Gomez, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/717,994

(22) Filed: Sep. 28, 2017

(65) Prior Publication Data

US 2018/0013664 A1    Jan. 11, 2018

Related U.S. Application Data

(63) Continuation of application No. 14/937,994, filed on Nov. 11, 2015.

(51) Int. Cl.
*H04L 12/725* (2013.01)
*H04L 12/723* (2013.01)
(Continued)

(52) U.S. Cl.
CPC ............ *H04L 45/308* (2013.01); *H04L 45/50* (2013.01); *H04L 47/2441* (2013.01); *H04W 28/065* (2013.01)

(58) Field of Classification Search
CPC .................................................... H04L 45/308
See application file for complete search history.

(56) References Cited

U.S. PATENT DOCUMENTS 6,526,044 B1 *  2/2003  Cookmeyer, II ...... H04L 41/142
                                                              370/352
6,795,918 B1     9/2004  Trolan
(Continued)

FOREIGN PATENT DOCUMENTS

CN         103973589 A    8/2014
CN         102523241 B    11/2014
(Continued)

OTHER PUBLICATIONS

IBM: List of IBM Patents or Patent Applications Treated as Related (Appendix P), Oct. 4, 2017, pp. 1-2.
(Continued)

*Primary Examiner* — Andrew Lai
*Assistant Examiner* — Andrew C Lee
(74) *Attorney, Agent, or Firm* — Michael A. Petrocelli

(57) ABSTRACT

A computer implemented method and system comprising receiving a data packet from a network source, extracting source and destination data from the received data packet, determining a user from the extracted source and destination data from the received data packet. If a label does not exist for the extracted source and destination data from the received data packet, creating a label for the data packet, the label comprising the extracted source data and historic source data for the determined user, calling a chaotic function with the label for the received data packet. If the chaotic function returns false, calling an alternative function for an output with the label for the received data packet. If the chaotic function returns true, capturing the output of the chaotic function, and updating the label with the output of the chaotic function or with the output of the alternative function.

1 Claim, 5 Drawing Sheets

(51) Int. Cl.
*H04L 12/851* (2013.01)
*H04W 28/06* (2009.01)

(56) References Cited

U.S. PATENT DOCUMENTS

| | | | |
|---|---|---|---|
| 7,177,930 B1* | 2/2007 | Lopresti | H04L 41/142 709/223 |
| 7,209,560 B1 | 4/2007 | Fairman et al. | |
| 7,289,560 B2* | 10/2007 | Huat | H04L 25/03012 375/239 |
| 8,095,635 B2 | 1/2012 | Wang et al. | |
| 8,125,908 B2 | 2/2012 | Rothstein et al. | |
| 8,676,729 B1 | 3/2014 | Keralapura et al. | |
| 9,444,730 B1* | 9/2016 | Campo Giralte | H04W 28/065 |
| 9,596,171 B1* | 3/2017 | Campo Giralte | H04L 45/308 |
| 2002/0152209 A1 | 10/2002 | Merugu et al. | |
| 2003/0007639 A1* | 1/2003 | Lambert | H04L 9/001 380/263 |
| 2005/0271207 A1* | 12/2005 | Frey | H04L 9/001 380/263 |
| 2008/0114564 A1* | 5/2008 | Ihara | G06F 17/30321 702/158 |
| 2009/0010259 A1 | 1/2009 | Sirotkin | |
| 2009/0141634 A1 | 6/2009 | Rothstein et al. | |
| 2009/0201899 A1* | 8/2009 | Liu | H04L 45/24 370/338 |
| 2010/0235285 A1* | 9/2010 | Hoffberg | G06Q 20/401 705/75 |
| 2011/0019574 A1* | 1/2011 | Malomsoky | H04L 41/5022 370/252 |
| 2014/0237097 A1 | 8/2014 | Riikonen | |
| 2015/0127790 A1* | 5/2015 | Smith | H04L 41/0816 709/221 |
| 2016/0204934 A1* | 7/2016 | Smith | H04L 63/10 713/171 |
| 2017/0134264 A1 | 5/2017 | Campo Giralte et al. | |

FOREIGN PATENT DOCUMENTS

| | | |
|---|---|---|
| WO | 2011154038 A1 | 12/2011 |
| WO | 2014036490 A1 | 3/2014 |

OTHER PUBLICATIONS

Han et al., "Heterogeneous Wireless Network Traffic Load Estimation based on Chaos Theory", 2012 IEEE, pp. 1-5.

Valenti et al., "Reviewing Traffic Classification", E. Biersack et al. (Eds.): Data Traffic Monitoring and Analysis, LNCS 7754, pp. 123-147, 2013.

Dong et al., "A Hybrid Method for Network Traffic Classification", 2013 2nd International Conference on Measurement, Information and Control, IEEE, pp. 653-656.

Hirvonen et al., "Two-Phased Network Traffic Classification Method for Quality of Service Management", The 13th IEEE International Symposium on Consumer Electronics (ISCE 2009), pp. 962-966.

* cited by examiner

NETWORK TRAFFIC CLASSIFICATION

BACKGROUND

The present invention relates to a method, system and computer program product for performing the classification of network traffic. Network operators that handle network traffic between, for example a mobile phone and a web server, classify the network traffic in order to obtain information about the use of their network.

SUMMARY

According to an aspect of the present invention, a computer implemented method, includes receiving a data packet from a network source; extracting source and destination data from the received data packet; and determining a user from the extracted source and destination data from the received data packet. The method includes creating a label for the data packet, in response to a determination that the label does not exist for the extracted source and destination data from the received data packet. The label including the extracted source data and historic source data for the determined user. The method includes calling a chaotic function with the label for the received data packet. The method further includes calling an alternative function for an output with the label for the received data packet, in response to the chaotic function being returned false. The method includes capturing the output of the chaotic function, in response to the chaotic function being returned true. The label is updated with the output of the chaotic function or with the output of the alternative function.

In another aspect according to the present invention, a system for controlling network traffic includes: a computer system comprising: a computer processor, computer-readable storage media, and program instructions stored on the computer-readable storage media, the program instructions being executable by the processor to cause the computer system to: receive a data packet from a network source; extract source and destination data from the received data packet; determine a user from the extracted source and destination data from the received data packet; create a label for the data packet, in response to a determination that the label does not exist for the extracted source and destination data from the received data packet, the label including the extracted source data and historic source data for the determined user; call a chaotic function with the label for the received data packet; call an alternative function for an output with the label for the received data packet, in response to the chaotic function being returned false; capture the output of the chaotic function, in response to the chaotic function being returned true; and update the label with the output of the chaotic function or with the output of the alternative function.

In another aspect according to the present invention, a computer program product for controlling network traffic comprises a computer readable storage medium having program instructions embodied therewith, the program instructions executable by a processor to cause the processor to perform the program instructions comprising:

Receiving a data packet from a network source; extracting source and destination data from the received data packet; determining a user from the extracted source and destination data from the received data packet; creating a label for the data packet, in response to a determination that the label does not exist for the extracted source and destination data from the received data packet, the label including the extracted source data and historic source data for the determined user; calling a chaotic function with the label for the received data packet; calling an alternative function for an output with the label for the received data packet, in response to the chaotic function being returned false; capturing the output of the chaotic function, in response to the chaotic function being returned true; and updating the label with the output of the chaotic function or with the output of the alternative function.

BRIEF DESCRIPTION OF THE DRAWINGS

Preferred embodiments of the present invention will now be described, by way of example only, with reference to the following drawings, hereinbelow.

DETAILED DESCRIPTION

Figure 1:
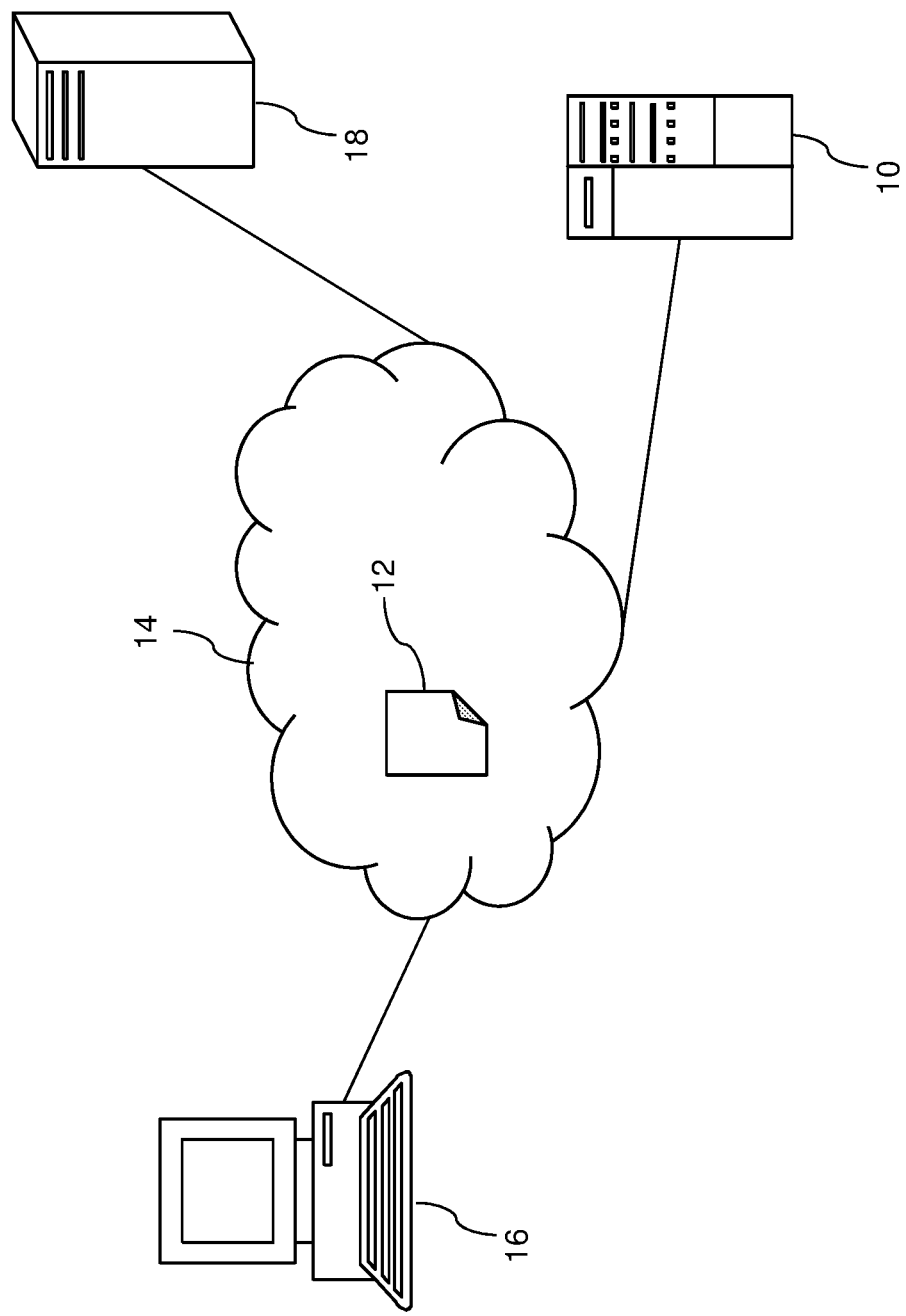
FIG. 1 is a schematic diagram of a client and a server communicating over a wide area network in accordance with a preferred embodiment.

FIG. 1 shows an appliance 10, which is embodied as a network collector, that is monitoring network traffic, shown here as a data packet 12 that is travelling through a wide area network 14 such as the Internet between a client device 16 and a server 18. Here, the client device 16 is a desktop PC. The main problem of network traffic classification is the large amount of network flow on fixed and mobile networks, such as the Internet, that is delivered through fixed line telecoms and mobile phone networks. The appliance 10 is not capable of analysing all of the network flow without vastly increasing processing load (CPU) and the power consumption. Therefore the appliance 10 is operated to efficiently classify network packets 12 by using a faster process that has an error rate that is acceptable in the context of the end result that is achieved.

With this method the appliance 10 is operated to discard network flows by using a source port of a user flow determined from the data packet 12 and a chaotic function that will compute which flows will be discarded and evaluated by the chaotic function. Due to this effect, the network collector 10 will boost the performance and, as a consequence of this effect, more traffic is analysed by the network collector 10. In order to boost the performance and the capabilities of the network collector 10, the collector 10 operates a method for discarding TCP/UDP (Transmission Control Protocol (TCP) and User Datagram Protocol (UDP) user network flows that uses a chaotic function based on the source port. Information is harvested from the data packet 12 and this harvested data is used to obtain the source port data and other information that is used by the network collector 10 to make the classification.

The steps of the process, from the point of view of the appliance 10, which operates as a network collector 10 are as follows. Firstly, the network collector 10 receives a packet 12 from a network device (such as an ethernet device). Then the network collector 10 extracts source and destination data in the form of a five-tuple from the packet 12, which comprises information about the IP source, source port, protocol, IP destination and destination port. From a user data field in the packet 12, by using the IP source, the collector 10 takes the user information associated with the user. If the network flow is not currently labelled, the collector 10 extracts from the flow and the user, the source port and a vector with the last used ports of the given user.

The network collector 10 will then call a chaotic function (such as a Lorenz attractor) using as arguments the source port of the flow and the created vector of the last used ports. If the chaotic function returns false on the update variable, this means that the algorithm being run by the network collector 10 must continue by analysing the network flow using standard methods such as pattern matching using ports and IP addresses and other data. If the chaotic function returns true, then the label has a value and the flow will be matching to this value. In this case, when the chaotic function returns a true value, then the CPU and memory consumption are reduced as a result of classifying the packet without recourse to a resource intensive method such as pattern matching. The flow is matched with the label, and the vector of the user is updated in order to have the new values added to the vector.

The network collector 10 classifies data traffic using the chaotic function in order to understand the nature of the network traffic. Classification of the data means identifying the application that generates the flow or conversation defined by one or more data packets. For example, an end user of a device 16 may be using an application such as an instant messenger. This application, when connected to the Internet, generates network traffic to messaging servers and/or other destinations. The conversations (flows) that this application generates are classified by the network collector 10 in order to identify the application and to generate relevant information for network operators. The classification does not attempt to predict the next user action, the process executed by the network collector 10 uses chaos theory to classify network traffic by using the source ports of the user as an input for the chaotic function. The algorithm executed by the collector 10 can be summarised according to the pseudo-code written below:

```
packet = getPacket( )
flow = getFlowFromPacket(packet)
user = getUserData(flow)
if flow.isNotLabel( ):
   sport = flow.getSourcePort( ) # int
   vport = user.getLastUsedPorts( ) # list( )
   update, label = chaoticCheaperMethod(sport,vport)
   if not update:
      # The chaotic function returns false, so the flow must be label
      # using standard dpi techniques (pattern matching or port/ip matching)
      label = analyseTheFlowByExpensiveMethods(flow)
   endif
   flow.setLabel(label) # the flow is marked as label also, step 8
   user.updateLastUsedPorts(sport,label)
endif
```

The process defined by the pseudo-code listed above takes the packet that is being classified and if the packet is not currently labelled, then a call is made to a chaotic function such as a Lorenz attractor, using the source port data and a vector created from the last used ports of the user as the arguments for the chaotic function, which will return true (with an output) or false (without an output). If the chaotic function does return an output, then this can be used to update the label by extending the label with the output returned. If the chaotic function does not return a label, then an alternative method of classifying the packet from the information available will be used.

Figure 2:
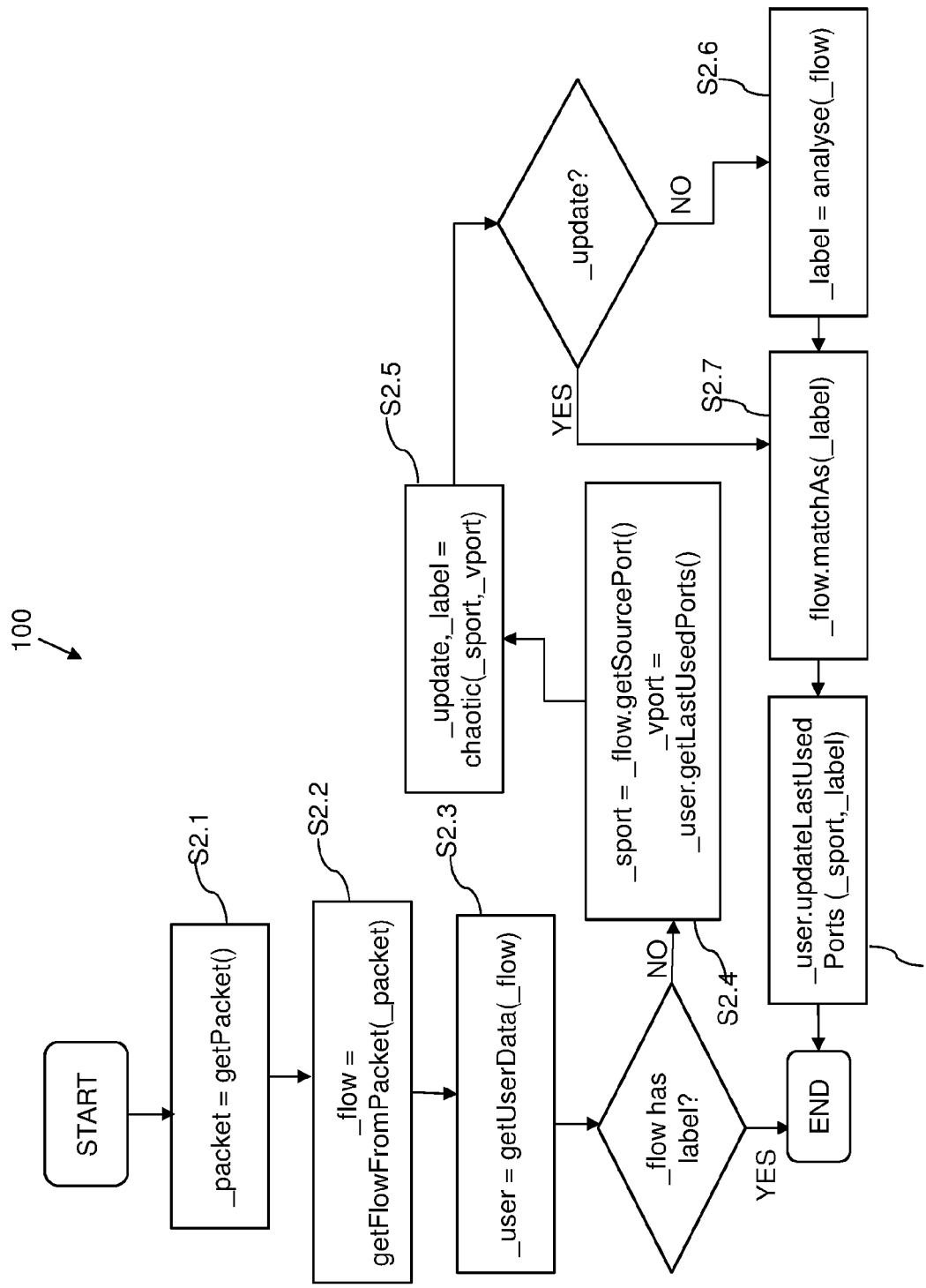
FIG. 2 is a flowchart of a method of classifying a network packet in accordance with a preferred embodiment.

FIG. 2 shows a flowchart that summarises the methodology of the network collector 10, which is executing an algorithm according to the process steps defined in the flowchart of FIG. 2. The algorithm defines a computer implemented method 100 that comprises at step S2.1 receiving a data packet from a network source, at step S2.2 extracting source and destination data from the received data packet, and at step S2.3 determining a user from the extracted source and destination data from the received data packet. A check is then made to see if the current flow is labelled and if a label does not exist for the received data packet, than at step S2.4 there is created a label for the data packet, the label comprising source data and historic source data for the determined user.

At step S2.5 the algorithm calls a chaotic function with the label for the received data packet. A check is then made to see if an update can be made, which will be the case id the chaotic function returned a true output. If the chaotic function returns false, the method continues at step S2.6 by calling an alternative function for an output with the label for the received data packet. If the chaotic function returns true, at step S2.7 there is captured the output of the chaotic function, and at step S2.8 the method terminates by updating the label with the output of the chaotic function or with the output of the alternative function.

In this way, the received packet is classified with a label if such a label does not already exist for the data flow that is defined by the data packet. In step S2.2 the extracting of source and destination data from the received data packet comprises extracting an IP source, source port, IP destination and destination port from the received data packet. In step S2.4 the creating of a label for the data packet, where the label comprising source data and historic source data for the determined user, comprises creating a label that comprises the source port and a vector comprising the last used ports of the determined user. In step S2.8 the updating of the label with the output of the chaotic function or with the output of the alternative function comprises the action of extending the vector with the source port and the output of the chaotic function or the output of the alternative function.

Figure 3:
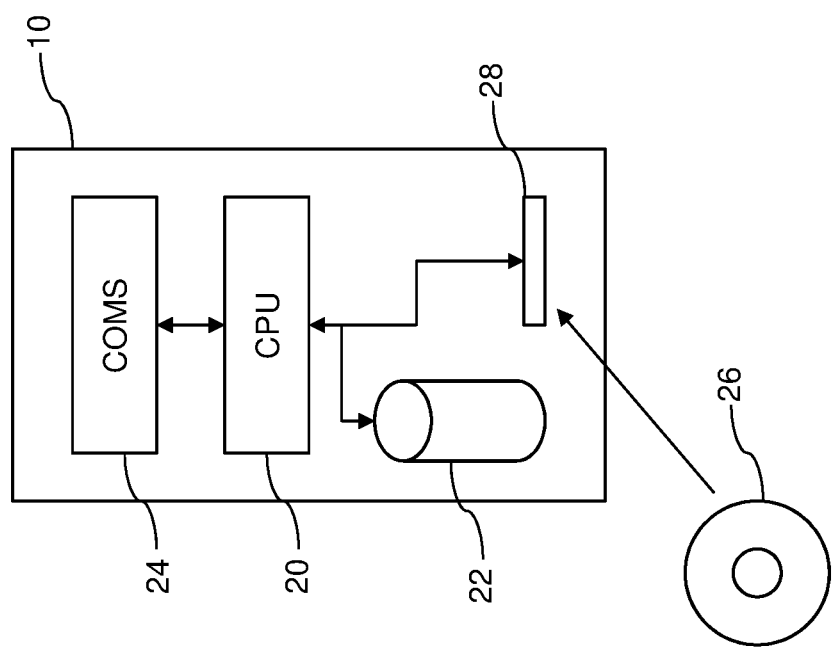
FIG. 3 is a schematic diagram of a server in accordance with a preferred embodiment.

FIG. 3 shows the appliance embodied as a network collector 10 in more detail as a system with components according to one embodiment, and thus the appliance/network collector 10 is also referred to as a system according to one embodiment of the network collector or just as a system. The system of the network collector 10 includes a processor 20, a storage device 22 that is connected to the processor 20 and a network interface 24 that is also connected to the processor 20. A computer readable medium 26 (a CD-ROM) is provided that comprises a computer program product. The system includes a drive 28 which is able to accept the CD-ROM 26. The computer program product comprises a set of instructions that are used to control the operation of the processor 20. The system operates by receiving data packets via the network interface 24 which are then examined by the processor 20 according to the algorithm detailed in FIG. 2 above. Results are stored in the storage device 22.

The system can be embodied as a server that is connected to the Internet. Network traffic can be monitored as the traffic is routed through one or more routing servers that are routing data packets through the Internet to their destination. The network collector 10 accesses data packets and extracts source and destination data from the data packets which is then used to label each data packet, if no such label already exists for the respective data packet. The label is created from the extracted information from the respective data packet. Source port and destination port data can be used to create the label for the specific data packet.

A chaotic function is called with the label in order to attempt to classify the data packet by determining the next port that the user will call. A chaotic function is used on the understanding that the function will not always be able to return a valid output, but that this is a price worth paying in order to use a lower cost option in terms of processor and time resources. If the chaotic function is unable to return a valid output then an alternative function will be used to classify the data packet that is currently being considered. The alternative function, in a preferred embodiment, uses pattern matching in order to classify the packet.

An example where the chaotic function returns "True" as the output is based on the following data that has been extracted from a received data packet by the network collector:
sport=509734
vport=((512000,"Facebook®"),(523100,"Facebook®"), (532198,"Facebook®"))

Source and destination data has been extracted from the received packet and a label is created that comprises the source port (sport) and a vector (vport) created from the last used destination ports of the user in question. In this example, three destination ports have been determined with a classification of the destination, in this case all three destination ports being for the website Facebook®. The vport is a two-dimensional vector, here comprised of three x,y co-ordinates. The sport and vport are the outputs of step S2.4 of FIG. 2. The label is then used as the call to the chaotic function being used as per the following pseudo-code:
update, label=chaoticCheaperMethod(sport,vport) # Update=True,
label="Facebook®"
flow.setLabel(label) # Facebook®
user.updateLastUserPorts(sport,label)#
vport=((512000,"Facebook®"),(523100, "Facebook®"), (532198, "Facebook®"), (509734, "Facebook®"))

The chaotic function being used has returned a valid output "Facebook®" and has therefore returned a "True" output. The label for the packet can therefore be extended with the generated classification and as can be seen in the final two lines of the pseudo-code, the vector defining the destination activity of the user has been extended by the addition of a new x,y co-ordinate, which is the sport plus the output returned by the chaotic function being used, here a Lorenz attractor. This is defined by the line of pseudo-code "user.updateLastUserPorts(sport,label)".

This processing of a data packet that has been received by the network collector 10 is carried out by the processor 20 under the control of the computer program product provided on the CD-ROM 26, as shown in FIG. 3. The processor 20 executes the algorithm shown in the flowchart of FIG. 2 and, if there is no label for the data packet (which is determined with reference to the user data extracted that has been extracted from the data packet) then the new label is generated and used to call the chaotic function. The chaotic function provides a valid output that is then used to extend the label for the packet in question.

A second example in which the chaotic function returns "False" will now be discussed, which is based upon the following data extracted from a second data packet. In this example, the source port and vector taken from the destination ports are as follows:
sport=509732
vport=((502000,"Google®"),(523110,"Facebook®"), (532191,"Facebook®"))

The vector generated from the destination information comprises a vector with three x,y co-ordinates that define calls to Google® and then twice to Facebook®. The pseudo-code continues as follows:
update, label=chaoticCheaperMethod(sport,vport) # Update=False, label="None" label=analyse(flow)
flow.setLabel(label) # Twitter® user.updateLastUserPorts (sport,label) # vport=((502000, "Google®"),(523110, "Facebook®"),(532191, "Facebook®"),(509732, "Twitter®"))

In this example, the chaotic function returns "False" so a standard classification (an expensive) method is used for analyse the flow. This alternative function, such as regex pattern, ip/port matching returns the label="Twitter®" and this is used to update the user's label for the packet in question. In this example the chaotic function failed to return a valid output and therefore the processor 20 continued the algorithm by calling an alternative function. The nature of the alternative function is not material, as long as the function uses a suitable technique that is able to return a prediction about the data packet being classified.

A further example in which the chaotic function returns a "True" value is further provided in which the extracted data from the received data packet is as follows:
sport=509799
vport=((502000,"Google®"),(523110,"Facebook®"), (532191,"Facebook®"),(509732,"Twitter®"))

In this example, the label generated in terms of the vector created from the last used destination ports of the specific user is a set of four x,y co-ordinates that define visits to four websites in turn, Google®, Facebook® (twice) and finally Twitter®. The vport (the vector from the destination ports) can be of any length and is generated from the available data relating to the data packet in question. The user is identified from the data packet, and stored data for that user can be used to generate a list of the previously visited destination port. The pseudo-code for the example continues as follows:
update, label=chaoticCheaperMethod(sport,vport) # Update=True, label="Twitter®"
flow.setLabel(label) # Twitter®
user.updateLastUserPorts(sport,label) # vport=((502000, "Google®"),(523110, "Facebook®"),(532191, "Facebook®"),(509732, "Twitter®"), (509799, "Twitter®"))

In this example, the chaotic function is able to return a valid output and this is the label "Twitter®" and this label is used to extend the vector that is extended by the x,y coordinate of the sport and the label generated by the chaotic function. In this way, the classification of the data packet is achieved and the label can be extended using the chaotic function and the label passed to the function that has been generated from the data extracted from the data packet.

Figure 4:
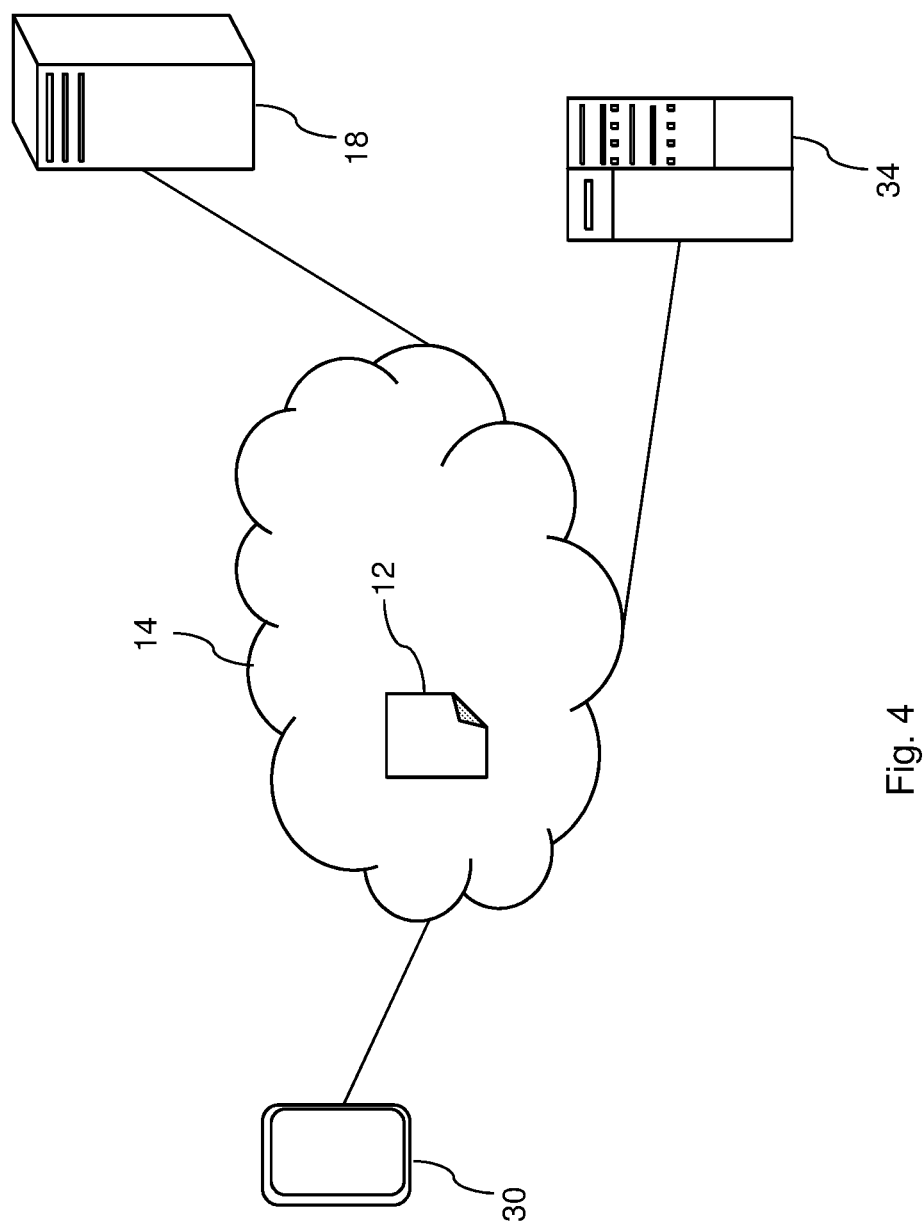
FIG. 4 is a schematic diagram of a mobile phone and a server communicating over a wide area network in accordance with a preferred embodiment.

FIG. 4 shows a further example of a device that is communicating over the Internet 14 with a server 18. In this example, the device is a mobile phone 30 that is able to access advanced Internet services through a wireless 3G service. The server 18 is running an instant messaging application and a network provider in the communication chain is operating an appliance embodied as a network classification server 34 (also referred to as a network classifier) that is able to access to data packets 12 that are being transmitted over the Internet to and from the mobile phone 30 and the server 18. The network operator could be the mobile phone provider, who wishes to classify the data traffic that is travelling on their network.

The data packet 12 is available to the network classifier 34 to classify the data packet 12, in terms of classifying the destination of the data packet using a chaotic function in the first instance, and an alternative function if the chaotic function is unable to classify the data packet 12. In this example, the extracted data from the received data packet 12 is as follows:

sport=10
vport=((1,"labelA"),(2,"labelB"),(8,"labelC"))

The chaotic function does not operate on the associated words. The function operates by computing the next probable point (source port). The labels are associated to a number that is the source port of the user. In this case, the sport is closer to the "labelC" because the associated number is 8, and 10 is closer to 8 than 1 and 2 in this example, so if the chaotic function returns a true value from these numbers, then the output will be the "labelC".

Thereby, the invention provides in one embodiment, a computer implemented method comprising receiving a data packet from a network source, extracting source and destination data from the received data packet, and determining a user from the extracted source and destination data from the received data packet. If a label does not exist for the extracted source and destination data from the received data packet, a label is created for the data packet. The label comprises the extracted source data and historic source data for the determined user. The method includes calling a chaotic function with the label for the received data packet. If the chaotic function returns false, the method calls an alternative function for an output with the label for the received data packet. If the chaotic function returns true, the method captures the output of the chaotic function. The method updates the label with the output of the chaotic function or with the output of the alternative function.

According to another embodiment of the present invention, a system comprises a processor arranged to receive a data packet from a network source, extract source and destination data from the received data packet, and determine a user from the extracted source and destination data from the received data packet. If a label does not exist for the extracted source and destination data from the received data packet, a label is created for the data packet. The label comprising the extracted source data and historic source data for the determined user. The system calls a chaotic function with the label for the received data packet. If the chaotic function returns false, the system calls an alternative function for an output with the label for the received data packet. If the chaotic function returns true, the system captures the output of the chaotic function, and updates the label with the output of the chaotic function or with the output of the alternative function.

According to another embodiment of the invention, there is provided a computer program product for controlling a system for controlling network traffic. The computer program product comprising a computer readable storage medium having program instructions embodied therewith, the program instructions executable by a processor to cause the processor to receive a data packet from a network source, extract source and destination data from the received data packet, determine a user from the extracted source and destination data from the received data packet. If a label does not exist for the extracted source and destination data from the received data packet, a label is created for the data packet. The label comprising the extracted source data and historic source data for the determined user. A chaotic function with the label for the received data packet is called. If the chaotic function returns false, an alternative function is called for an output with the label for the received data packet. If the chaotic function returns true, the output of the chaotic function is captured, and the label is updated with the output of the chaotic function or with the output of the alternative function.

Figure 5:
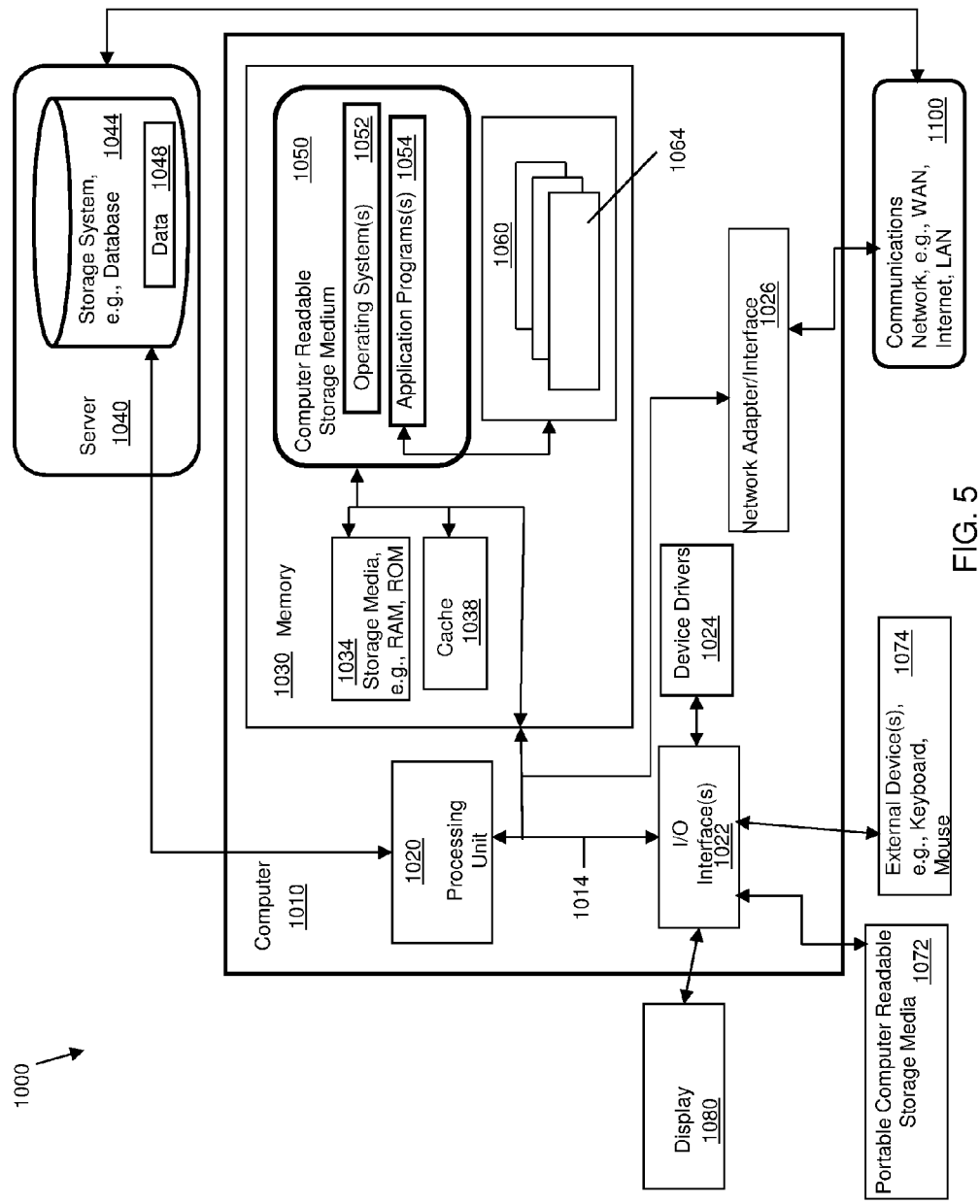
FIG. 5 is a block diagram of a computer system according to one embodiment of the disclosure.

Referring to FIG. 5, according to one embodiment of the present disclosure, a computing system or computer system 1000 (previously introduced and illustrated in FIG. 1) is described below in more detail. The computer system 1000 may also be considered a node of a plurality of computers or nodes of a system. The computer system 1000 is illustrative and is not intended to suggest any limitation as to the scope of use or functionality of embodiments of the invention described herein. The computer system 1000 includes a computer 1010 (which may be embodied as a server), is operational with numerous other general purpose or special purpose computing system environments or configurations. Examples of well-known computing systems, environments, and/or configurations that may be suitable for use with the computer 1010 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types.

The computer 1010 may be practiced in a distributed cloud computing environment where tasks are performed by remote processing devices that are linked through a communications network, generically referred to as a network 1100. In a distributed cloud computing environment, program modules may be located in both local and remote computer system storage media including memory storage devices.

As shown in FIG. 5, the computer system 1000 and computer 1010 are shown in the form of a general-purpose computing device. The components of the computer 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 typically includes a variety of computer readable media. Such media may be any available media that is accessible by the computer 1010 (e.g., computer system, or server), and can include both volatile and non-volatile media, as well as, removable and non-removable media.

Computer memory 1030 can include additional computer readable storage media 1034 in the form of volatile memory, such as random access memory (RAM) and/or cache memory 1038. The computer 1010 may further include other removable/non-removable, volatile/non-volatile computer storage media, in one example, portable computer readable storage media 1072. In one embodiment, a computer readable storage medium 1050 can be provided for reading from and writing to a non-removable, non-volatile magnetic media. The computer readable storage medium 1050 can be embodied, for example, as a hard drive. Additional memory and data storage can be provided, for example, as a storage system 1044 (e.g., a database) for storing data 1048 and communicating with the processing unit 1020. The database can be stored on or part of a server 1040 Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the invention.

One or more computer programs can generically be referred to as a program 1060. The program 1060 can include program modules 1064, and may be stored in memory 1030. By way of example, the memory 1030 may store an operating system 1052, an application program 1054, other program modules, and program data. The program modules 1064 can generally carry out functions and/or methodologies of embodiments of the invention as described herein. The one or more programs 1060 are stored in memory 1030 and are executable by the processing unit 1020. It is understood that the operating system 1052 and application program 1054 stored on the computer readable storage medium 1050 are similarly executable by the processing unit 1020.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via Input/Output (I/O) interfaces 1022. Still yet, the computer 1010 can communicate with one or more networks 1100 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

The method 100 (FIG. 2) may be embodied in a program 1060 (FIG. 5) embodied on a computer readable storage device, for example, generally referred to as memory 1030, and can more specifically refer to computer readable storage medium 1050, as shown in FIG. 5. The program 1060 is executable by the processor 1020 of the computer system 1010 (to execute program steps, code, or program code). Additional data storage may also be embodied as the database 1044 which includes data 1048. The program or executable instructions may be offered as a service by a provider. The computer 1010 and program 1060 shown in FIG. 5 are generic representations of a computer and program that may be local to a user, or provided as a remote service (for example a cloud based service), and may be provided in further examples, using a website accessible using a network 1100 (e.g., interacting with a network, the Internet, or cloud services). It is understood that the computer 1010 and computer system 1000 also generically represents herein a computer device or a computer included in a device, such as a laptop or desktop computer, etc., or one or more servers, alone or as part of a datacenter. The computer and computer system can include the network adapter/interface 1026, and the input/output (I/O) interface (s) 1022. The I/O interface 1022 allows for input and output of data with an external device 1074 that may be connected to the computer system. The network adapter/interface 1026 may provide communications between the computer system and a computer network generically shown as the network 1100. The method steps and system components and techniques may be embodied in modules of the program 1060 for performing the tasks of each of the steps of the method and system, which are generically represented in FIG. 5 as program modules 1064. The program 1060 and program modules 1064 can execute specific steps, routines, sub-routines, instructions or code, of the program. The method of the present disclosure can be run locally on a device such as a mobile device, or can be run a service, for instance, on the server 1040 which may be remote and can be accessed using the communications network 1100.

It is understood that a computer or a program running on the computer 1010 may communicate with a server, herein embodied as the server 1040, via one or more communications networks, herein embodied as the network 1100. The communications network 1100 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer, including a mobile device, can use a communications system or network 1100 which can include the Internet, or a public switched telephone network (PSTN), for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A system, comprising:
  a computer system which comprises a computer processor, a non-transitory computer-readable storage medium, and program instructions stored on the non-transitory computer-readable storage medium being executable by the computer processor, to cause the computer system to perform the program instructions which comprise,
  receiving a data packet from a network source and a network device, including network traffic on one or more of: a fixed network, and a mobile network;
  extracting source and destination data from the received data packet using a network collector executing an algorithm, the extracting of source and destination data from the received data packet comprises extracting an IP source, a source port, an IP destination and a destination port from the received data packet;
  determining a user from the extracted source and destination data from the received data packet, the determining the user including extracting from a user data field in the data packet user information associated with the user via the network collector;
  creating a label for the data packet, in response to a determination that the label does not exist for the extracted source and destination data from the received data packet, the label including the extracted source data and historic source data for the determined user, the label includes the source port and a vector comprising last used ports of the determined user;
  calling a chaotic function using the network connector with the label for the received data packet, the calling of a chaotic function with the label for the received data packet comprises calling a Lorenz attractor function with the label for the received data packet;
  calling an alternative function for an output with the label for the received data packet, and updating the label with output of the alternative function, in response to the chaotic function being returned false, and, in response to the chaotic function being returned false, the algorithm being run by the network collector analysing the network flow using one or more of: pattern matching using ports, and IP addresses;
  capturing the output of the chaotic function, in response to the chaotic function being returned true, and updating the label with the output of the chaotic function; and
  the updating the label with the output of the chaotic function or with the output of the alternative function comprises, extending the vector with the source port and the output of the chaotic function or the output of the alternative function.

* * * * *